United States Patent [19]
Namimatsu et al.

[11] Patent Number: 5,749,265
[45] Date of Patent: May 12, 1998

[54] BALL SCREW DEVICE

[75] Inventors: Ken Namimatsu, Maebashi; Manabu Matsuura, Takasaki, both of Japan

[73] Assignee: NSK, Ltd., Tokyo, Japan

[21] Appl. No.: 534,927

[22] Filed: Sep. 28, 1995

Related U.S. Application Data

[63] Continuation of Ser. No. 226,328, Apr. 12, 1994, abandoned.

[30] Foreign Application Priority Data

Apr. 12, 1993 [JP] Japan .................. 5-084442
Apr. 12, 1993 [JP] Japan .................. 5-084443

[51] Int. Cl.$^6$ ........................... F16H 25/22
[52] U.S. Cl. ................... 74/459; 74/424.8 R
[58] Field of Search ........... 74/89.15, 424.8 R, 74/424.8 NA, 441, 459

[56] References Cited

U.S. PATENT DOCUMENTS

| | | | |
|---|---|---|---|
| 2,779,206 | 1/1957 | Doerfner | 74/459 |
| 4,221,137 | 9/1980 | Futaba | 74/216.3 X |
| 4,542,661 | 9/1985 | Teramachi | 74/424.8 NA |
| 4,557,156 | 12/1985 | Teramachi | 74/459 |
| 4,680,982 | 7/1987 | Wilke et al. | 74/424.8 R |
| 5,239,882 | 8/1993 | Druet | 74/424.8 |
| 5,263,381 | 11/1993 | Shirai | 74/441 |
| 5,373,754 | 12/1994 | Takei | 74/424.8 NA |

FOREIGN PATENT DOCUMENTS 61-54541  4/1986  Japan .

*Primary Examiner*—Charles A. Marmor
*Assistant Examiner*—Troy Grabow
*Attorney, Agent, or Firm*—Shapiro and Shapiro

[57] ABSTRACT

A ball screw device is designed such that a load axially applied to a ball nut is uniformly supported by balls of all ball screw groove portions. The design is such that a gap along a load acting line between a ball and a ball screw groove portion farther from an attachment portion of the ball nut is smaller than a gap between a ball and a ball screw groove portion closer to the attachment portion, by an amount corresponding to an elastic deformation caused in the corresponding screw groove portion of the ball nut by a load acting on the ball nut.

36 Claims, 6 Drawing Sheets

BALL SCREW DEVICE

This is a continuation of application Ser. No. 08/226,328 filed Apr. 12, 1994, now abandoned.

BACKGROUND OF THE INVENTION

1. Field of the Invention

The present invention relates to a ball screw device, and more particularly to an improved ball screw device in which, when a large predetermined axial load is applied to a ball nut, the load is uniformly supported by balls of all screw groove portions of a ball screw groove.

2. Related Background Art

A known ball screw device comprises a ball screw shaft having a spiral screw groove formed on an outer periphery thereof, a ball nut having a spiral ball screw groove facing the above ball screw groove formed on an inner periphery thereof, and a number of balls rotatably interposed between the opposing ball screw grooves. In such a ball screw device, the ball screw shaft and the ball nut contact-through the rolling of the balls so that the ball nut can make a spiral motion relative to the ball screw shaft with a small drive force.

In the prior art ball screw device, the ball screw groove of the ball screw shaft and the ball screw groove of the ball nut are formed to have the same lead. As a result, when an axial load applied to the ball nut is small, the load is supported by the balls of all ball screw groove portions, but when the axial load is large, the load is concentrated to balls of particular ball groove portions, so that those ball screw groove portions and the balls thereof are worn or damaged. Consequently, a lifetime of the ball screw device is shortened.

In another prior art ball screw device, effective diameters of the ball screw grooves of the ball nut are equal. As a result, when the axial load applied to the ball nut is small, the load is supported by the balls of all screw groove portions; but when the axial load is large, the load is concentrated to the balls of particular screw groove portions, so that those screw groove portions and the balls thereof are worn or damaged. Consequently, the lifetime of the ball screw device is shortened.

In order to attain a desired lifetime of the ball screw device, it is conceivable to use balls of a large diameter or to increase the number of balls, in order to increase a diameter of the ball nut. However, such measures lead to an increase of the size of the ball screw device, and an increase in manufacturing cost and weight.

SUMMARY OF THE INVENTION

It is an object of the present invention to provide a ball screw device which solves the prior art problems and in which, when a large predetermined axial load is applied to a ball nut, the load is uniformly supported by balls in all ball screw groove portions of the ball screw shaft and the ball nut.

In order to achieve the above object, in a first aspect of the present invention, the ball screw groove of the ball nut is formed such that a gap along a load acting line to the ball at ball screw groove portions which are farther from an attachment portion, where the ball nut is attached to a fixing member is smaller than a gap at ball screw groove portions which are closer to the attachment portion, by an amount corresponding to an elastic deformation caused in the ball screw portions of the ball nut by the predetermined load acting on the ball nut.

The above-described construction is based on the finding that, in the prior art ball screw device, when the axial load applied to the ball nut is large, the loads applied to the balls in the ball screw groove portions are not uniform. According to analysis by the inventors of a present invention, the stress acting on the ball of the ball screw groove portion which is farther from the attachment portion of the ball nut is small whereas a larger stress is applied to the ball of a ball screw groove portion which is closer to the attachment portion, and the lifetime of the ball screw device is determined by the latter factor. This is due to the fact that when a load is applied to the attachment portion, the ball nut is somewhat axially deformed (expanded and contracted). As a result, a stress acting on a ball which is farther from the attachment portion and which receives a larger elastic deformation is relatively reduced, so that a ball closer to the attachment supports a load larger than a mean load.

By forming the gap to the ball in the ball screw portion closer to the attachment portion and the gap to the ball in the ball screw portion farther from the attachment portion in the manner described above, the stresses acting on the balls in all ball groove portions can be made substantially uniform.

In accordance with a second aspect of the present invention, effective diameters of the ball screw groove portions of the ball nut are selected such that a gap along a load acting line to the ball at ball screw groove portions which are farther from an attachment portion, where the ball nut is attached to a fixing member, is smaller than a gap at ball screw groove portions which are closer to the attachment portion, by an amount corresponding to an elastic deformation caused in the ball screw portions of the ball nut by the load acting on the ball nut. This is also based on the aforementioned finding.

By selecting the effective diameters of the ball screw groove portions of the ball nut so that the gap to the balls in the ball screw portions farther from the attachment portion of the ball nut screw groove portions to the balls between the balls in the ball screw groove portions closer to the attachment portion and the ball screw groove portions differ in the manner described above, the stresses acting on the balls in all ball screw groove portions can be made substantially uniform.

DETAILED DESCRIPTION OF THE PREFERRED EMBODIMENTS

A first embodiment of the present invention is now explained with reference to the accompanying drawings.

Figure 1:
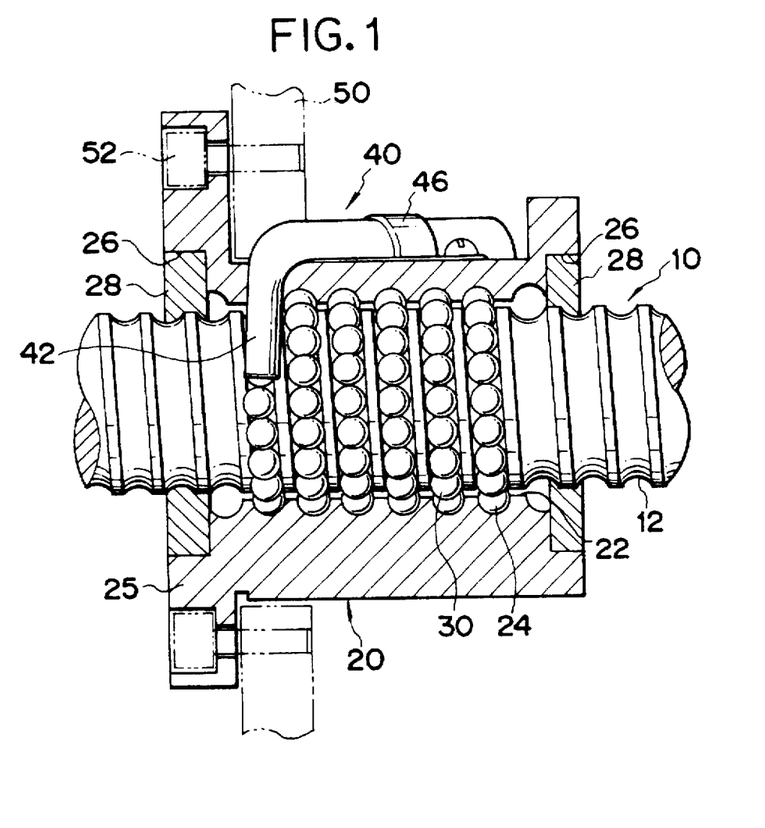
FIG. 1 shows an overall perspective (partially cut away) view of a first embodiment of the present invention.
Figure 2:
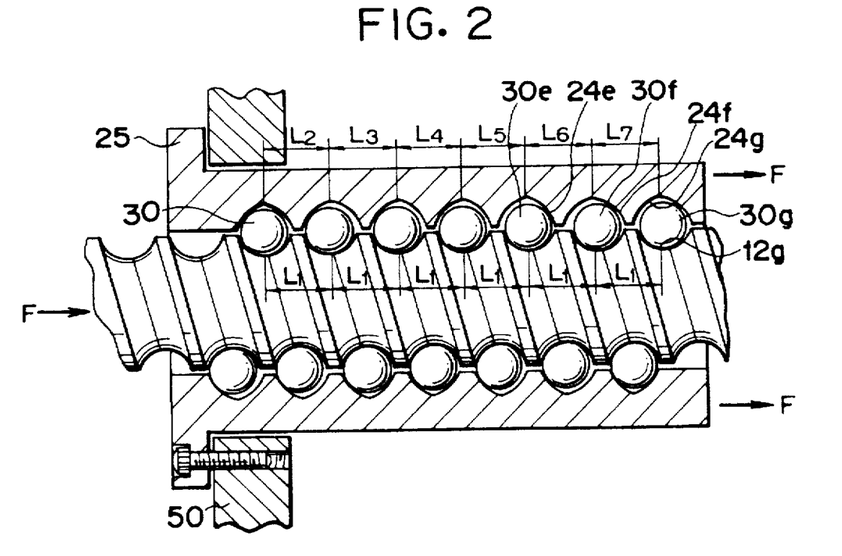
FIG. 2 shows an enlarged view of a principal portion of FIG. 1.
Figure 6:
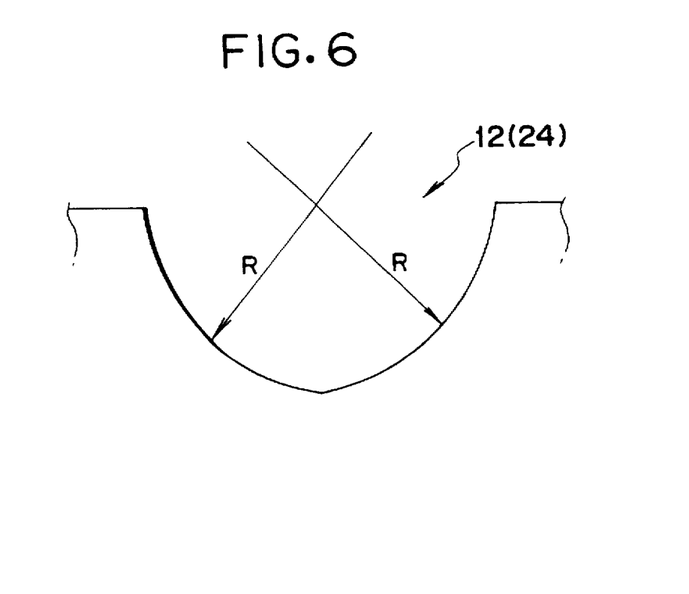
FIG. 6 shows an enlarged view of a ball screw groove.

As shown in FIG. 1, a ball screw device comprises a ball screw shaft 10, a ball nut 20, a plurality of balls 30 and a ball return tube 40. A ball screw groove 12 of so-called gothic arch shape (see FIG. 6) is spirally formed on an outer periphery of the ball screw shaft 10 and a lead thereof is constant $L_1$ (see FIG. 2) over the entire length thereof.

The ball nut 20 has a hole 22 of a slightly larger inner diameter than an outer diameter of the ball screw shaft 10 and a screw groove 24 (see FIG. 6) of gothic arch shape is spirally formed on an inner periphery thereof to oppose to the ball screw groove 12 of the ball screw shaft. Leads $L_2$–$L_7$ are equal over the entire length ($L_2$=$L_3$=$L_4$=$L_5$=$L_6$ $L_7$), and they are smaller than $L_1$ (see FIG. 2).

The ball screw grooves 12 and 24 may be readily machined by an NC screw groove grinder by controlling a lead ratio of the ball screw shaft 10 and the ball nut 20 by a predetermined program.

Turning back to FIG. 1, the ball nut 20 has a radially extending flange 25 at a left end and it is fixing to a fixed member 50 by the flange 25 through bolts 52. Holes 26 of a large diameter are formed at the opposite ends of the hole 22 and seals 28 having inward projections to fit to the ball screw grooves are fixed to the holes 26 to prevent foreign materials such as dusts and chips from entering into the ball nut. A pair of through-holes 29 (only one of which is shown) are formed perpendicularly to an axial line of the ball nut 20 with an axial spacing therebetween, to which ends 42 (only a portion thereof is shown in FIG. 1) of a generally U-shaped ball return tube 40 are inserted. Leading ends of the ends 42 open to a ring-shaped space formed by the ball screw grooves 12 and 24. The ball return tube 40 is attached to the ball nut 20 by a clamp member 46.

An operation of the present embodiment is now explained.

When a counterclockwise rotating force, as viewed from the left of FIG. 1 is applied to the ball screw shaft 10, the ball screw shaft 10 is smoothly rotated through the rolling of the balls 30 and the fixing member 50 coupled to the flange 25 which is an attachment portion of the ball nut 20, is moved rightward as the ball screw shaft is rotated. The balls 30 between the ball screw grooves 12 and 24 are rolled in the ball screw grooves 12 and 24 as the ball screw shaft 10 is rotated, and they reach the left end of the ball nut 20 are picked up by the left end 42 of the ball return tube 40, moved rightward in the ball return tube 40 and returned to right portions of the ball screw grooves 12 and 24 from the right end (not shown) of the ball return tube 40.

When the ball screw shaft 10 is rotated, a force is transmitted to the ball screw grooves 24 of the ball nut 20 through the balls 30. Since the leads $L_2$–$L_7$ of the ball screw groove 24 of the ball nut are selected to be smaller than the lead $L_1$ of the ball screw groove 12 of the ball screw shaft 10, the force is first transmitted through the ball 30g which is farthest from the flange 25 of the ball nut, and as the axial force applied to the ball screw shaft 10 increases, the right end of the ball nut 20 is axially expanded by that force. As a result, the lead of the ball screw groove at the right end becomes slightly larger than $L_7$ and equal to the lead $L_1$ of the ball screw groove 12 of the ball screw shaft 10. Consequently, a gap between the ball 30f and the ball screw groove portion 24f of the ball nut is reduced and the ball 30f finally contacts the thread bottom of the ball screw groove portion 24f so that the ball nut 20 receives a tensile stress from the groove bottom of the ball screw groove portion 24f.

Figure 3:
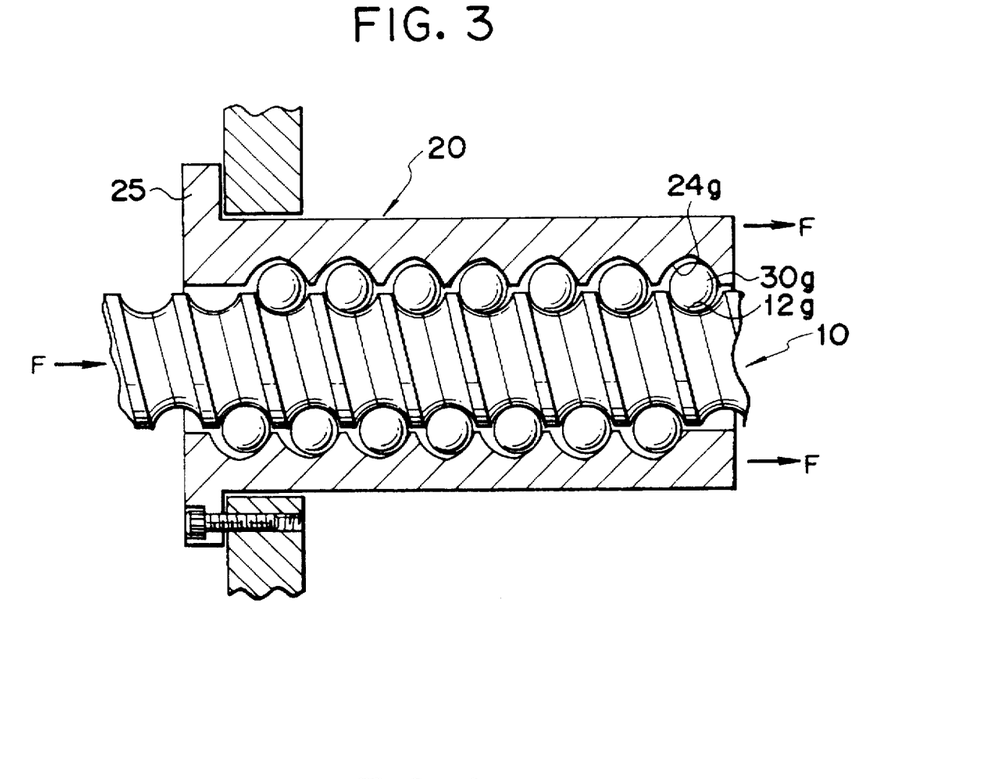
FIG. 3 illustrates an operation of the embodiment.

Thereafter, as the axial force of the ball screw shaft 10 increases, the ball nut 20 is sequentially expanded axially so that the next ball 30e contacts the groove bottom of the ball screw groove portion 24e, and so on until the remaining balls contact the corresponding ball screw groove portions under a predetermined load (see FIG. 3). In this manner, the lead of each ball screw groove portion 24 of the ball nut 20 is expanded by an amount corresponding to an elastic deformation of the ball nut 20 at the corresponding ball screw groove portion 24 and the leads $L_2$–$L_7$ of all ball screw groove portions 24 become equal to the lead $L_1$ of the ball screw shaft 10. As a result, the respective balls support the loads of equal magnitude. Thus, an excessive load is not applied to a particular ball and a ball screw device of long lifetime is attained.

The present ball screw device attains the long lifetime when a predetermined load (high load) is applied, for the reason mentioned above. When a load applied to the balls is small, the loads applied to the respective balls are not uniform. However, this does not cause a problem. Indeed, since the load is supported by a smaller number of balls when the load is small, an acting torque is very small, which is another advantage of the present invention.

Figure 4:
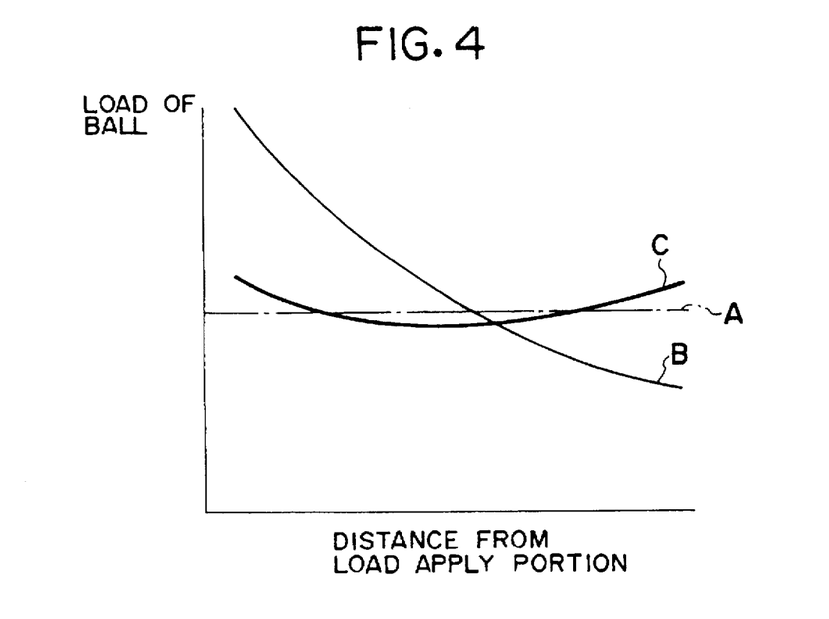
FIG. 4 shows a graph illustrating an effect of the embodiment.

FIG. 4 shows plots of loads applied to the balls 30 in the ball screw groove portions of the ball nut 20. A straight line A (chain line) shows a load of the ball when it is assumed that the ball nut is perfectly rigid, a curve B is for a conventional device in which the ball screw groove of the ball screw shaft and the ball screw groove of the ball nut have the same lead, and a curve C is for the present embodiment.

As seen from FIG. 4, when a predetermined load is applied axially of the conventional ball nut, an excess force is applied to the balls closer to the attachment portion in the conventional device as shown by the curve. By contrast, in the present embodiment, a substantially uniform load is applied to the balls of all ball screw groove portions, as seen from the curve C, and the application, of an excess load is prevented. Thus, the wear or damage of a particular ball screw groove portion is prevented and the lifetime of the ball screw device is extended.

Figure 5:
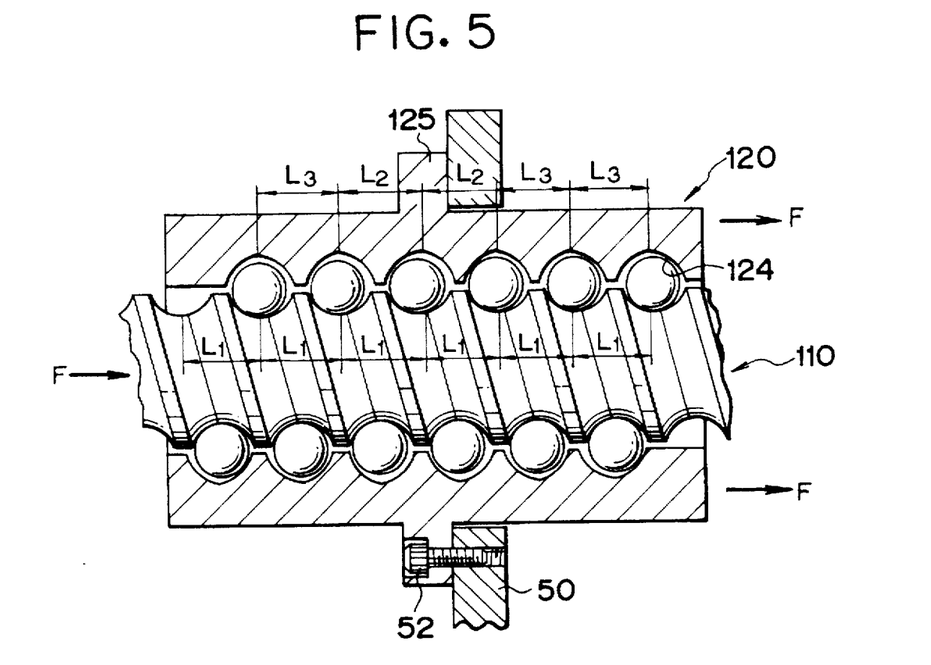
FIG. 5 shows a sectional view of a second embodiment of the present invention.

In a second embodiment shown in FIG. 5, a flange 125 formed at an axial center of a ball nut 120 is fixed to a fixing member 50 by bolts 52. In the present embodiment, leads of adjacent ball screw groove portions of the ball nut 120 are $L_2$ in the area closer to an flange 125 and $L_3$ which is larger than $L_2$, in areas farther from the flange 125, because the rigidity of the ball nut 120 is greater in the vicinity of the flange 125. As a result, a gap between the ball screw groove portion 124 and the ball is large at the flange 125 and smaller farther from the flange 125, and they are symmetric around the flange 125. The value of leads $L_2$ and $L_3$ may be appropriately determined by experiment.

In the second embodiment, when a predetermined load is applied to the ball nut 120, all balls 130 equally support the load for the same reason as that described in connection with the first embodiment.

While positive gaps having spacings between two members have been shown in the above embodiments, the gaps in the present invention also include negative gaps in which two members contact with elastic deformation.

In the first embodiment, the leads of the ball screw groove 24 of the ball nut 20 are constant over the entire length.

Where the elastic deformation of the ball screw groove caused by the load changes with the axial position of the ball nut, the gaps may be adjusted by taking the elastic deformation into consideration.

In accordance with the present invention, when a large load is applied to the ball nut, the ball screw groove portions of the nut are elastically deformed so that the load is uniformly supported by all ball screw groove portions. As a result, the wear or damage of particular ball screw portions or balls is prevented and the lifetime of the ball screw device is extended. This is attained without substantially complicating the construction or changing the size relative to the prior art ball screw device.

A third embodiment of the present invention is now explained with reference to the drawings. Elements of the ball screw corresponding to those of the first and second embodiments are designated by corresponding reference numerals having "2" as a prefix. The following description addresses the principal differences from the earlier-described embodiments.

Figure 7:
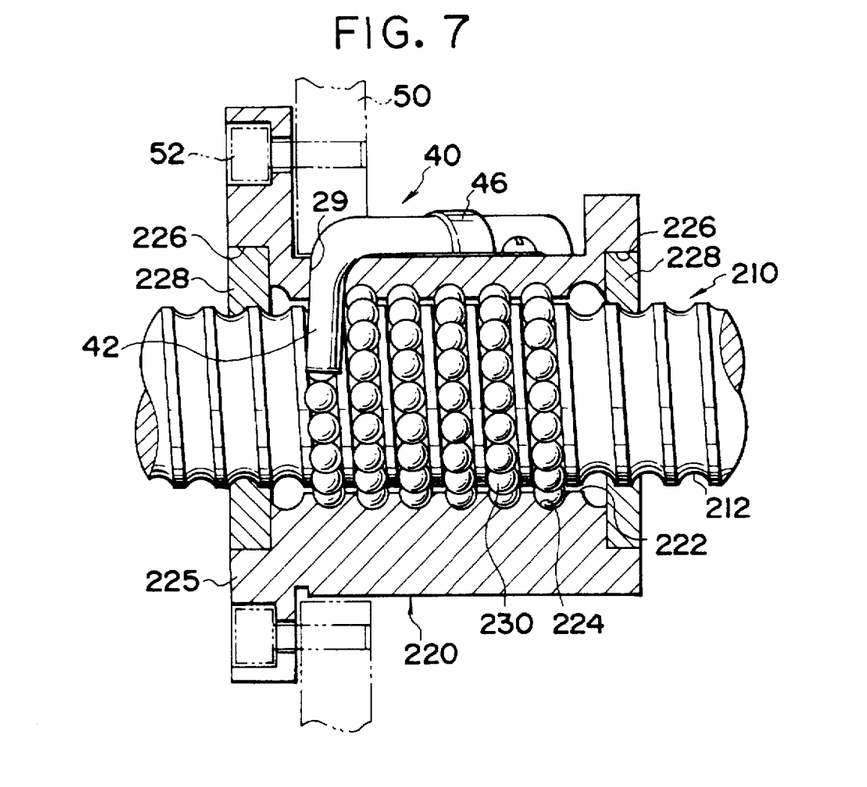
FIG. 7 shows an overall perspective (partially cut away) view of a third embodiment of the present invention.
Figure 8:
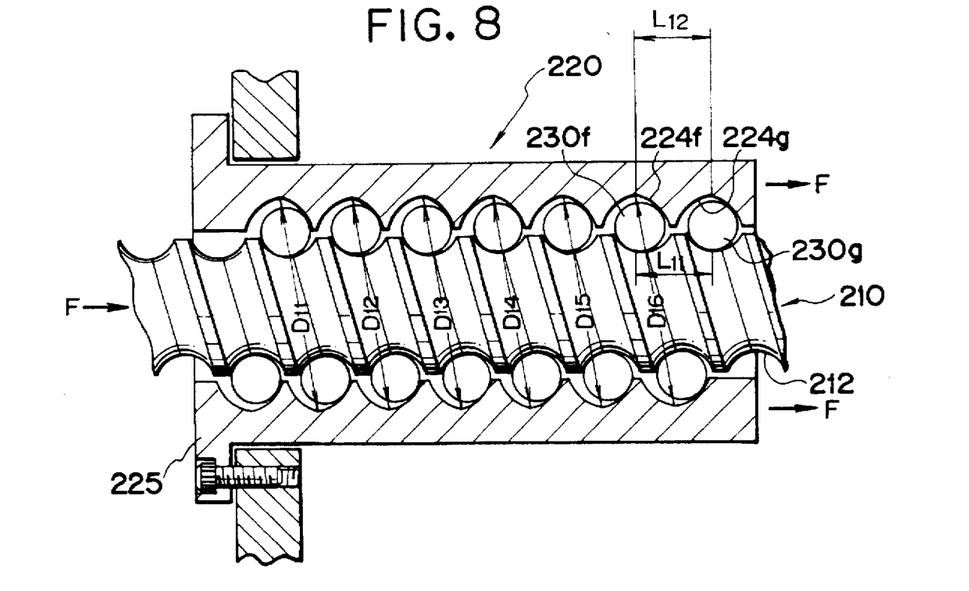
FIG. 8 shows an enlarged view of a principal portion of FIG. 7.
Figure 12:
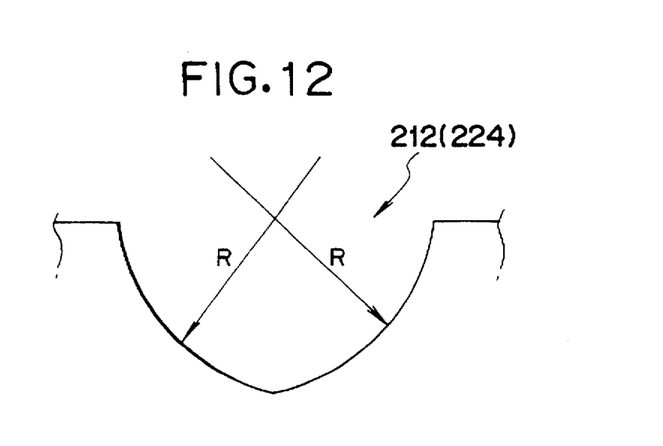
FIG. 12 shows an enlarged view of a ball screw groove.

As shown in FIG. 7, a ball screw device comprises a ball screw shaft 210, a ball nut 220, a plurality of balls 230 and a ball return tube 240. The ball screw shaft 210 has a spiral ball screw groove 212 of so-called gothic-arch shape (see FIG. 12) formed on an outer periphery thereof.

The ball nut 220 has a hole 222 of a slightly larger inner diameter than an outer diameter of the ball screw groove 212 and has a spiral ball screw groove 224 of the gothic-arch shape (see FIG. 12) facing the ball screw groove 212 of the ball screw shaft formed on an inner periphery thereof. A lead $L_{11}$ of the ball screw groove 224 is equal to a lead $L_{12}$ of the ball screw groove 212 of the ball screw shaft ($L_{11}=L_{12}$). An effective diameter is $D_{11}$ at the left end screw groove portion of the ball nut and $D_{16}$ at the right end screw groove portion, and the effective diameters gradually decrease therebetween ($D_{11}>D_{12}>D_{13}>D_{14}>D_{15}>D_{16}$).

Namely, the effective diameters of the ball screw groove portions 224 of the ball nut 220 are selected such that a gap along a load acting line between the ball and the ball screw groove portion which is further from the flange 225 the attachment portion; is smaller than a gap between the ball and the ball screw groove portion which is closer to the flange 225, by an amount corresponding to an elastic deformation caused in the ball screw groove portion of the ball nut by the load acting on the ball nut 220.

The ball screw grooves 212 and 224 may be readily machined by an NC screw groove grinder by controlling a lead ratio of the ball screw shaft 110 and the ball nut 220 by a predetermined program.

An operation of the present embodiment is now explained.

As the ball screw shaft 210 is rotated, a force is transmitted to the ball screw groove 224 of the ball nut 220 through the balls 230. Since the gap along the load acting line between the ball and the ball screw groove which is farther from the flange 225 is smaller than the gap between the ball and the ball screw groove which is closer to the flange 225, by the amount corresponding to the elastic deformation caused in the ball screw groove of the ball nut by the load acting on the ball nut 220, the force is first transmitted to the ball 230g which is farthest from the flange 225 of the ball nut. As the axial force applied to the ball screw shaft 210 increases, the ball nut 220 is axially expanded by the force so that the lead becomes slightly larger than $L_{12}$. Then the gap between the ball 230f and the ball screw groove portion 224f of the ball nut is reduced and the ball 230f finally contacts the groove bottom of the ball screw groove portion 224f and the ball nut 220 receives a tensile stress from the thread bottom of the ball screw thread portion 224f.

Figure 9:
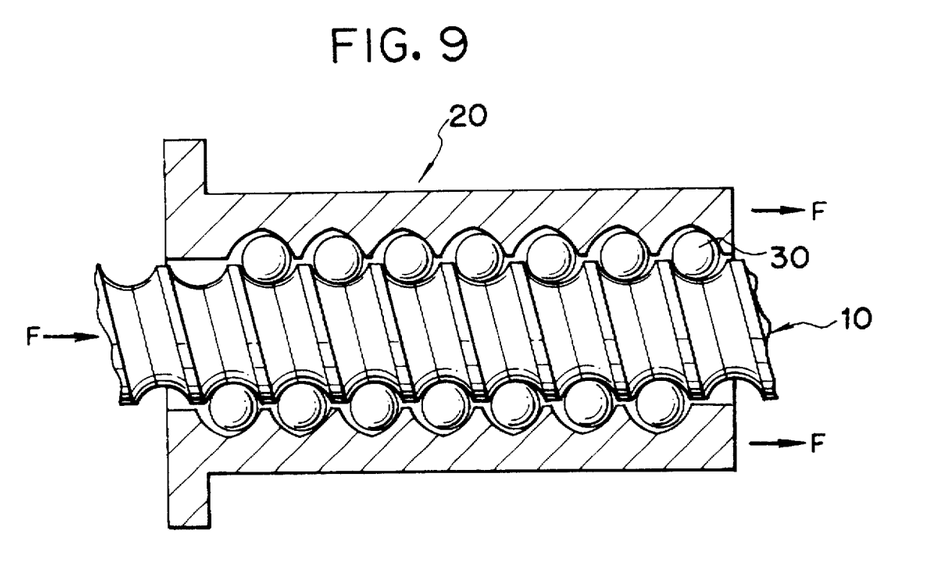
FIG. 9 illustrates an operation of the embodiment.

Thereafter, as the axial force of the ball screw shaft 210 increases, the ball nut 220 is sequentially expanded axially and the next ball contacts, and under the predetermined load, the remaining balls contact the corresponding ball screw groove portions (see FIG. 9). In this manner, the leads at the contacts of the ball nut 220 and the ball screw groove portions 224 are expanded by the amounts corresponding to the elastic deformations of the ball nut at the respective ball screw groove portions 224 and become equal to the lead $L_{11}$ of the ball screw shaft 210, so that the respective balls support loads of equal magnitude. Thus, an excess load is not applied to a particular ball and the ball screw device of a long lifetime is provided.

In the ball screw device of the present embodiment, the long lifetime is attained by accommodating the predetermined load (high load) as described. When a small load is applied to the present ball screw device, the load to the balls is not uniform, but this does not cause a problem. The load is supported by a smaller number of balls under the small load, which, as earlier described, is another advantage of the invention.

Figure 10:
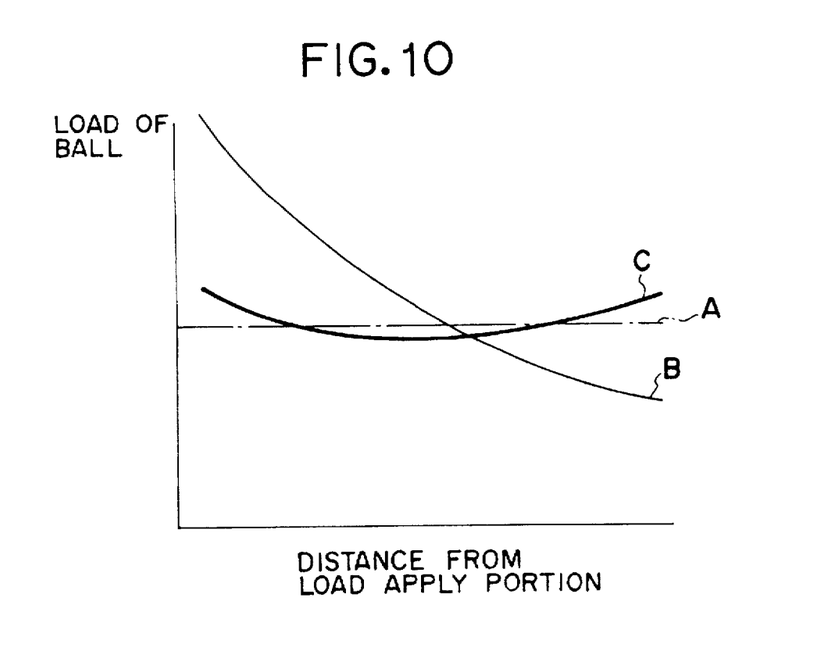
FIG. 10 shows a graph illustrating an effect of the embodiment.

An effect of the present embodiment is illustrated in FIG. 10.

FIG. 10 shows a graph similar to that of FIG. 4. As seen from FIG. 10, in accordance with the present embodiment, a substantially uniform load is applied to the balls at all screw groove portions, as shown by the curve C, and the application of an excess load is prevented. Thus, the wear or damage of a particular screw groove portion is prevented and the lifetime of the ball screw device is extended.

Figure 11:
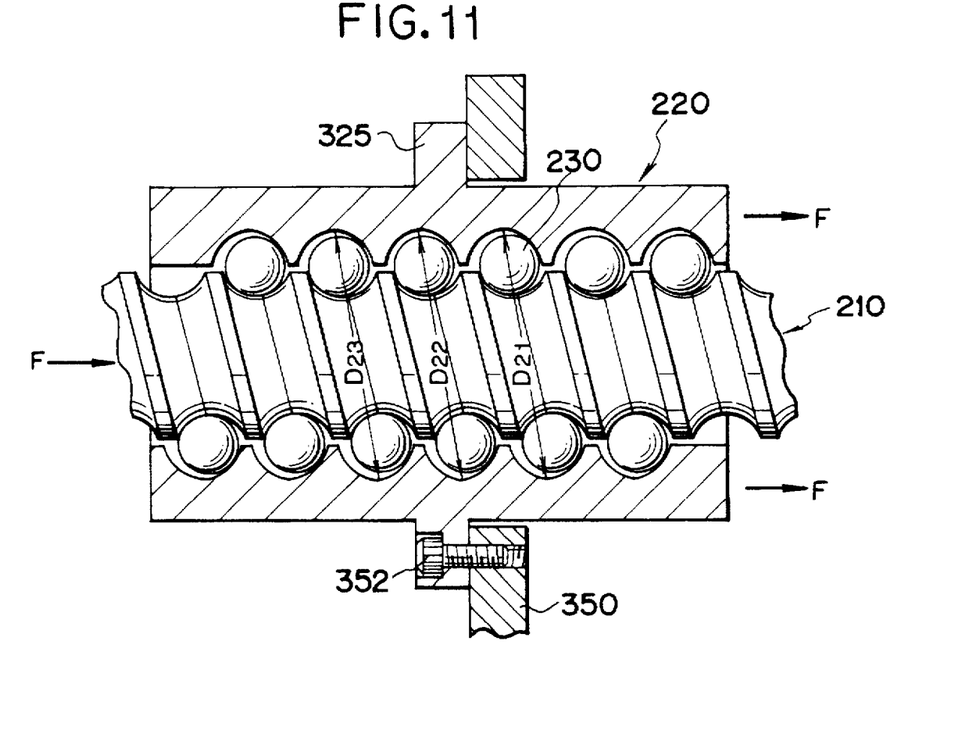
FIG. 11 shows a sectional view of a fourth embodiment of the present invention.

In a fourth embodiment, shown in FIG. 11, a flange 325 formed at an axial center of the ball nut 320 mounted on ball screw shaft 310 is fixed to a fixing member 350 by bolts 352. In the present embodiment, effective diameters of the adjacent ball screw groove portions of the ball nut 320 are $D_{21}$ in the area closer to the flange 325, and $D_{22}$, $D_{23}$ in areas farther from the flange 325, where $D_{21}>D_{22}>D_{23}$. As a result, a gap to the ball is larger in the area closer to the flange and smaller going away from the flange 325 and they are symmetric around the flange 325. $D_{21}$–$D_{23}$ may be appropriately determined by an experiment.

In the fourth embodiment, when the predetermined load is applied, all balls 330 support equal load for the same reason as that described in connection with the third embodiment, provided that a ratio of change of the effective diameter $D_{21}$ is set slightly lower than that of the effective diameters $D_{22}$ and $D_{23}$, because the rigidity of the nut is high in the vicinity of the flange 325.

In accordance with the present invention, when a predetermined axial load is applied to the ball nut, it expands so that the balls and the screw groove portions contact in all screw groove portions and the axial load is uniformly supported by the balls in all screw groove portions. As a result, the wear or damage of a particular screw groove portion is prevented and the lifetime of the ball screw device is extended. This is attained without substantially complicating the construction or changing the size relative to the prior art ball screw device.

What is claimed is:

1. A ball screw device, comprising:
    a ball screw shaft having an outer periphery formed with a spiral groove;

a ball nut having an inner periphery formed with a spiral groove facing the groove of said ball screw shaft, and having an attachment portion to be fixed to a fixing member; and a plurality of balls rotatably interposed between said grooves to transmit axial force from said ball screw shaft to said ball nut upon rotation of said ball screw shaft;

wherein the ball nut groove is configured such that, for a ball in a first portion of the ball nut groove farther from the attachment portion, a gap defined by the ball and a wall of the groove portion along a load acting line on which the ball transmits an axial force component from the ball screw shaft to the ball nut is smaller than a corresponding gap for a ball in a second portion of the ball nut groove closer to said attachment portion, by an amount corresponding to an elastic deformation of the first groove portion by a predetermined axial force acting on said ball nut.

2. A ball screw device according to claim 1, wherein a lead of the groove of the said ball screw shaft is constant.

3. A ball screw device according to claim 2, wherein a lead of the ball nut groove is constant over its entire length and smaller than said lead of the groove of said ball screw shaft.

4. A ball screw device according to claim 3, wherein said attachment portion is formed at an axial end of said ball nut.

5. A ball screw device according to claim 2, wherein a lead of the ball nut groove is greater toward opposite axial ends of said ball nut than at an axially intermediate position of said ball nut.

6. A ball screw device according to claim 5, wherein said attachment portion is formed at said intermediate position.

7. A ball screw device according to claim 6, wherein said intermediate position is a central position between said ends of said ball nut.

8. A ball screw device according to claim 1, wherein balls in said first and second groove portions substantially uniformly support a predetermined axial load acting on said ball nut.

9. A ball screw device, comprising:

a ball screw shaft having an outer periphery formed with a spiral groove;

a ball nut having an inner periphery formed with a spiral groove facing the groove of said ball screw shaft, and having an attachment portion to be fixed to a fixing member; and a plurality of balls rotatably interposed between said grooves to transmit axial force from said ball screw shaft to said ball nut upon rotation of said ball screw shaft;

wherein an effective diameter of the ball nut groove changes such that, for a ball in a first portion of the ball nut groove farther from the attachment portion, a gap defined by the ball and a wall of the groove portion along a load acting line, on which the ball transmits an axial force component from the ball screw shaft to the ball nut, is smaller than a corresponding gap for a ball in a second portion of the ball nut groove closer to said attachment portion, by an amount corresponding to an elastic deformation of the first groove portion by a predetermined axial force acting on said ball nut.

10. A ball screw device according to claim 9, wherein the effective diameter of the ball nut groove gradually changes along an axial direction of said ball nut.

11. A ball screw device according to claim 10, wherein said attachment portion is formed at an axial end of said ball nut.

12. A ball screw device according to claim 10, wherein said attachment portion is formed at a central position between opposite axial ends of said ball nut.

13. A ball screw device according to claim 9, wherein the effective diameter of the ball nut groove decreases, with increases in distance from said attachment portion.

14. A ball screw device according to claim 9, wherein balls in said first and second groove portions substantially uniformly support a predetermined axial load acting on said ball nut.

15. A ball screw device, comprising:

a ball screw shaft having an outer periphery formed with a spiral groove;

a ball nut having an inner periphery formed with a spiral groove facing the groove of said ball screw shaft, and having an attachment portion to be fixed to a fixing member; and a plurality of balls rotatably interposed between said grooves to transmit axial force from said ball screw shaft to said ball nut upon rotation of said ball screw shaft;

wherein the grooves of said ball screw shaft and said ball nut are configured such that respective gaps are defined by walls of plural portions of the ball nut groove and balls disposed in said plural groove portions, along corresponding load acting lines on which the balls transmit respective axial force components from the ball screw shaft to the ball nut, and lengths of said gaps increase in an order from a groove portion farther from said attachment portion to a groove portion closer to said attachment portion, so that balls in said plural groove portions assume respective axial load components sequentially, in the order from said groove portion farther from said attachment portion to said groove portion closer to said attachment portion, as the axial force transmitted to said ball nut increases.

16. A ball screw device according to claim 15, wherein the balls in said plural groove portions substantially uniformly support a predetermined axial force transmitted to said ball nut.

17. A ball screw device according to claim 15, wherein said attachment portion is formed at an axial end of said ball nut.

18. A ball screw device according to claim 15, wherein said attachment portion is formed at an axially intermediate portion of said ball nut.

19. A ball screw device according to claim 15, wherein the grooves of said ball screw shaft and said ball nut have constant leads, with the lead of the ball nut groove being smaller than that of the groove of said ball screw shaft.

20. A ball screw device according to claim 15, wherein a lead of the ball nut groove is smaller at an axially intermediate portion of the ball nut and larger toward opposite axial ends of the ball nut, and a lead of the groove of said ball screw shaft is constant.

21. A ball screw device according to claim 15 wherein an effective diameter of the ball nut groove changes gradually along an axial direction of said ball nut.

22. A ball screw device according to claim 21, wherein said attachment portion is formed at an axial end of said ball nut.

23. A ball screw device according to claim 21, wherein said attachment portion is formed at a central position between opposite axial ends of said ball nut.

24. A ball screw device according to claim 21, wherein an effective diameter of the ball nut groove decreases, with increases in distance from said attachment portion.

25. A ball screw device according to claim 15 wherein an effective diameter of said ball nut groove is greater closer to said attachment portion and smaller farther from said attachment portion.

26. A ball screw device, comprising:
a ball screw shaft having an outer periphery formed with a spiral groove;
a ball nut having an inner periphery formed with a spiral groove facing the groove of said ball screw shaft, and having an attachment portion to be fixed to a fixing member; and
a plurality of balls rotatably interposed between said grooves to transmit axial force from said ball screw shaft to said ball nut upon rotation of said ball screw shaft;
wherein the grooves of said ball screw shaft and said ball nut are configured such that respective gaps are defined by walls of plural portions of the ball nut groove and balls disposed in said plural groove portions, along corresponding load acting lines on which the balls transmit respective axial force components from said ball screw shaft to said ball nut, and lengths of said gaps increase in an order from a groove portion toward one end of the ball nut groove to a groove portion toward an opposite end of the ball nut groove, so that balls in said plural groove portions assume respective axial load components sequentially, in the order from said groove portion toward said one end of the ball nut groove to said groove portion toward said opposite end of the ball nut groove, as the axial force transmitted to said ball nut increases.

27. A ball screw device according to claim 26, wherein the balls in said plural groove portions substantially uniformly support a predetermined axial force transmitted to said ball nut.

28. A ball screw device according to claim 26, wherein said attachment portion is formed at an axial end of said ball nut.

29. A ball screw device according to claim 26, wherein said attachment portion is formed at an axially intermediate position of said ball nut.

30. A ball screw device according to claim 26, wherein the grooves of said ball screw shaft and said ball nut have constant leads, with the lead of the ball nut groove being smaller than that of the groove of said ball screw shaft.

31. A ball screw device according to claim 26, wherein a lead of the ball nut groove is smaller at an axially intermediate position of said ball nut and larger toward opposite axial ends of said ball nut, and a lead of the groove of said ball screw shaft is constant.

32. A ball screw device according to claim 26, wherein an effective diameter of the ball nut groove changes gradually along an axial direction of said ball nut.

33. A ball screw device according to claim 32, wherein said attachment portion is formed at an axial end of said ball nut.

34. A ball screw device according to claim 32, wherein said attachment portion is formed at central position between opposite axial ends of said ball nut.

35. A ball screw device according to claim 26, wherein the effective diameter of the ball nut groove decreases, with increases in distance from said attachment portion.

36. A ball screw device according to claim 26, wherein an effective diameter of said ball nut groove is greater closer to said attachment portion and smaller farther from said attachment portion.

* * * * *